(12) United States Patent
Gianchandani et al.

(10) Patent No.: US 10,287,877 B2
(45) Date of Patent: May 14, 2019

(54) INTERROGATING SUBTERRANEAN HYDRAULIC FRACTURES USING MAGNETOELASTIC RESONATORS

(71) Applicants: The Regents of The University of Michigan, Ann Arbor, MI (US); Saudi Arabian Oil Company, Dhahran (SA)

(72) Inventors: Yogesh Gianchandani, Ann Arbor, MI (US); Scott Green, South Lyon, MI (US); Kamal Sarabandi, Ann Arbor, MI (US); Mazen Kanj, Dhahran (SA); Howard Schmidt, Dhahran (SA); Jun Tang, Ann Arbor, MI (US); Jiangfeng Wu, Ann Arbor, MI (US)

(73) Assignees: THE REGENTS OF THE UNIVERSITY OF MICHIGAN, Ann Arbor, MI (US); SAUDI ARABIAN OIL COMPANY, Dhahran (SA)

( * ) Notice: Subject to any disclaimer, the term of this patent is extended or adjusted under 35 U.S.C. 154(b) by 205 days.

(21) Appl. No.: 15/113,180

(22) PCT Filed: Jan. 26, 2015

(86) PCT No.: PCT/US2015/012947
§ 371 (c)(1),
(2) Date: Jul. 21, 2016

(87) PCT Pub. No.: WO2015/112996
PCT Pub. Date: Jul. 30, 2015

(65) Prior Publication Data
US 2017/0030189 A1     Feb. 2, 2017

Related U.S. Application Data

(60) Provisional application No. 61/931,934, filed on Jan. 27, 2014.

(51) Int. Cl.
*E21B 47/09*    (2012.01)
*E21B 49/00*    (2006.01)
(Continued)

(52) U.S. Cl.
CPC ............ *E21B 49/00* (2013.01); *E21B 43/267* (2013.01); *G01V 3/081* (2013.01); *E21B 43/26* (2013.01); *G01V 3/38* (2013.01)

(58) Field of Classification Search
CPC ..... E21B 47/09; E21B 47/0905; E21B 47/122
See application file for complete search history.

(56) References Cited

U.S. PATENT DOCUMENTS 6,439,310 B1    8/2002  Scott et al.
7,228,900 B2 *  6/2007  Schultz ................... E21B 43/04
                                                166/227
(Continued)

FOREIGN PATENT DOCUMENTS

WO    WO2014004815 A1    1/2014

OTHER PUBLICATIONS

International Search Report corresponding to International application No. PCT/US2015/012947, dated Apr. 30, 2015, 4 pages.

(Continued)

*Primary Examiner* — Catherine Loikith
(74) *Attorney, Agent, or Firm* — Reising Ethington P.C.

(57) ABSTRACT

A fracture interrogation system includes an antenna adapted for placement in a subterranean wellbore and a plurality of pseudoparticles adapted for distribution with a proppant material into hydraulic fractures along the wellbore. The presence of the pseudoparticles in the hydraulic fractures is detectable by the antenna. The pseudoparticles can include a magnetoelastic resonator having a resonant frequency. An interrogation field excites the resonators at the resonant frequency for detection by the antenna. The same or a (Continued)

different antenna can act as the interrogation field source, and the system can be configured to operate in a talk-and-listen mode to better separate the response signal from the interrogation signal. Electromagnetic, mechanical, or acoustic impulses can be used to excite resonators of the pseudoparticles.

20 Claims, 12 Drawing Sheets

(51) Int. Cl.
*E21B 43/267* (2006.01)
*G01V 3/08* (2006.01)
*G01V 3/38* (2006.01)
*E21B 43/26* (2006.01)

(56) References Cited

U.S. PATENT DOCUMENTS

| | | | | |
|---|---|---|---|---|
| 7,424,911 | B2* | 9/2008 | McCarthy | C09K 8/805 166/250.12 |
| 7,677,306 | B2 | 3/2010 | Lecampion et al. | |
| 7,933,718 | B2 | 4/2011 | McDaniel et al. | |
| 8,168,570 | B2* | 5/2012 | Barron | B01J 13/02 428/357 |
| 9,488,046 | B2* | 11/2016 | Purkis | E21B 47/122 |
| 2007/0289741 | A1* | 12/2007 | Rambow | E21B 47/0006 166/250.01 |
| 2009/0151939 | A1* | 6/2009 | Bailey | E21B 47/1015 166/255.1 |
| 2009/0250216 | A1 | 10/2009 | Bicerano | |
| 2009/0288820 | A1 | 11/2009 | Barron et al. | |
| 2010/0038083 | A1 | 2/2010 | Bicerano | |
| 2012/0227483 | A1 | 9/2012 | Kruspe et al. | |
| 2012/0273192 | A1 | 11/2012 | Schmidt et al. | |
| 2012/0305242 | A1 | 12/2012 | Charara et al. | |
| 2014/0374091 | A1* | 12/2014 | Wilt | E21B 49/00 166/254.1 |

OTHER PUBLICATIONS

Written Opinion corresponding to International application No. PCT/US2015/012947, dated Apr. 30, 2015, 9 pages.
S. Abdullah et al., "Design Small Size of High Frequency (HF) Helical Antenna," 5th International Colloquium on Signal Processing and Its Applications (CSPA), 2009, pp. 259-262.
P. Anderson III, "Magnetomechanical Coupling, ΔE Effect, and Permeability in FeSiB and FeNiMoB Alloys", Journal of Applied Physics, Nov. 1982, pp. 8101-8103, vol. 53, No. 11.
J. Baker et al., "Low-Profile Multifrequency HF Antenna Design for Coastal Radar Applications", IEEE Antennas and Wireless Propagation Letters, 2010, pp. 1119-1123, vol. 9.
A. Clark et al., "A New Method of Magnetostrictivity and Magnetostriction Measurement", IEEE Transactions on Magnetics, Sep. 1989, pp. 3611-3613, vol. 25, No. 5.
J. Y. Dea, "Electrically Small Plate Antenna That Operates at HF", IEEE Antennas and Propagation Society International Symposium, 2005, pp. 15-16.
S.R. Green et al., "Wireless Magnetoelastic Monitoring of Biliary Stents," IEEE/ASME Journal of Microelectromechanical Systems, Feb. 2009, pp. 64-78, vol. 18, No. 1.
C. Grimes et al., "Simultaneous Measurement of Liquid Density and Viscosity Using Remote Query Magnetoelastic Sensors", Review of Scientific Instruments, Oct. 2000, pp. 3822-3824, vol. 71, No. 10.
C. Grimes et al., "Wireless Magnetoelastic Resonance Sensors: A critical review", Sensors, Jul. 2002, pp. 294-313, vol. 2, No. 7.
C. Grimes et al., "A Remotely Interrogatable Magnetochemical Sensor for Environmental Monitoring," in Proc. IEEE Aerospace Conference, 1998, pp. 87-92.

M. Jain et al., "A Wireless Micro-Sensor for Simultaneous Measurement of pH, Temperature, and Pressure", Smart Materials and Structures, Apr. 2001, pp. 347-353, vol. 10, No. 2.
E. B. Joffe, "A Large Flat Biconical Antenna for LLSC Aircraft-Illumination in the HF band", IEEE International Symposium on Electromagnetic Compatibility, 1996, pp. 465-468.
H.E. King et al., "Helical Antennas", Antenna Engineering Handbook Third Edition, 1992, Chapter 13, pp. 1-24, McGraw-Hill.
R. Wilensky, "High-Frequency Antennas", Antenna Engineering Handbook Third Edition, 1992, Chapter 26, pp. 1-42, McGraw-Hill.
S. Kawdungta et al., "Design of Flat Spiral Rectangular Loop Gate Antenna for HF-RFID Systems", Asia-Pacific Microwave Conference, 2008, pp. 1-4.
M.H. Kim et al., "Magnetostriction Measurements of Metallic Glass Ribbon by Fiber-Optic Mach-Zehnder Interferometry", Journal of Magnetism and Magnetic Materials, Jan. 1999, pp. 107-112, vol. 191, No. 1.
J.D. Livingston, "Magnetomechanical Properties of Amorphous Metals", Physica Status Solidi (A), 1982, pp. 591-596, vol. 70, No. 2.
D. Mader (editor), "Propped Fracture and Gravel Pack Monitoring", Developments in Petroleum Science, 1989, pp. 843-958, vol. 26, Elsevier.
L. Mattioni et al., "Design of a Broadband HF Antenna for Multimode Naval Communications", IEEE Antennas and Wireless Propagation Letters, 2005, pp. 179-182, vol. 4.
C. Modzelewski et al., "Magnetomechanical Coupling and Permeability in Transversely Annealed Metglas 2605 Alloys", IEEE Transactions on Magnetics, Nov. 1981, pp. 2837-2839, vol. 17, No. 6.
K. Ong et al., "Magnetoelastic Sensors for Biomedical Monitoring", Sensor Letters, 2005, pp. 108-116, vol. 3, No. 2, American Scientific Publishers.
J.C. Reis et al., "Measuring Hydraulic Fracture Width Behind Casing Using a Radioactive Proppant", SPE Formation Damage Control Symposium, Feb. 1996, pp. 31-41, Society of Petroleum Engineers.
H. Ryu et al., "A Small Quarter Wavelength Microstrip Antenna for HF and VHF Band Applications", Mediterranean Microwave Symposium (MMS), 2010, pp. 48-51.
G.E. Sleefe et al., "The Use of Broadband Microseisms for Hydraulic-Fracture Mapping", SPE Formation Evaluation, Dec. 1995, pp. 233-240, vol. 10, No. 4.
P. Stoyanov et al., "A remote query magnetostrictive viscosity sensor", Sensors and Actuators, 2000, pp. 8-14, vol. 80, No. 1.
K. Takahata et al., "Batch Mode Micro-Electro-Discharge Machining", Journal of Microelectromechanical Systems, Apr. 2002, pp. 102-110, vol. 11, No. 2.
C.A. Wright et al., "Downhole Tiltmeter Fracture Mapping: Finally Measuring Hydraulic Fracture Dimensions", SPE Western Regional Conference, May 1998, pp. 1-15.
K. Zeng et al., "Wireless Magnetoelastic Physical, Chemical, and Biological Sensors", IEEE Transactions on Magnetics, Jun. 2007, pp. 2358-2363, vol. 43, No. 6.
J. Zhai et al., "Giant Magnetoelectric Effect in Metglas/Polyvinylidene-Fluoride Laminates", Applied Physics Letters, Aug. 2006, vol. 89, No. 8, American Institute of Physics.
Z. Zhang et al., "V-Shape Wire-Structured HF Bowtie Antenna", 8th International Symposium on Antennas and Propagation and EM Theory (ISAPE), 2008, pp. 207-210.
Z. Zhang et al., "A Novel HF Fishbone Antenna with Vee-Element", IEEE International Conference on Communications Technology and Applications, 2009, pp. 733-737.
X. Zhao et al., "Application of the Villari Effect to Electric Power Harvesting", Journal of Applied Physics, Apr. 2006, pp. 1-3, vol. 99, No. 8, American Institute of Physics.
Z. Zhigang et al., "HF Compound Antennas Consisting of a Horizontal LPDA and a Vertical Mono-Cone Antenna", IEEE International Symposium on Microwave, Antenna, Propagation and EMC Technologies for Wireless Communications, 2009, pp. 687-689.
B. Lecampion et al., "Mapping of hydraulic fractures from tiltmeter measurements", AGU Fall Meeting Abstracts, Dec. 2003.

(56) References Cited

OTHER PUBLICATIONS

Ground Water Protection Council and ALL Consulting, "Modern Shale Gas Development in the United States: A Primer", Apr. 2009, pp. 56-66, U.S. Department of Energy.

* cited by examiner

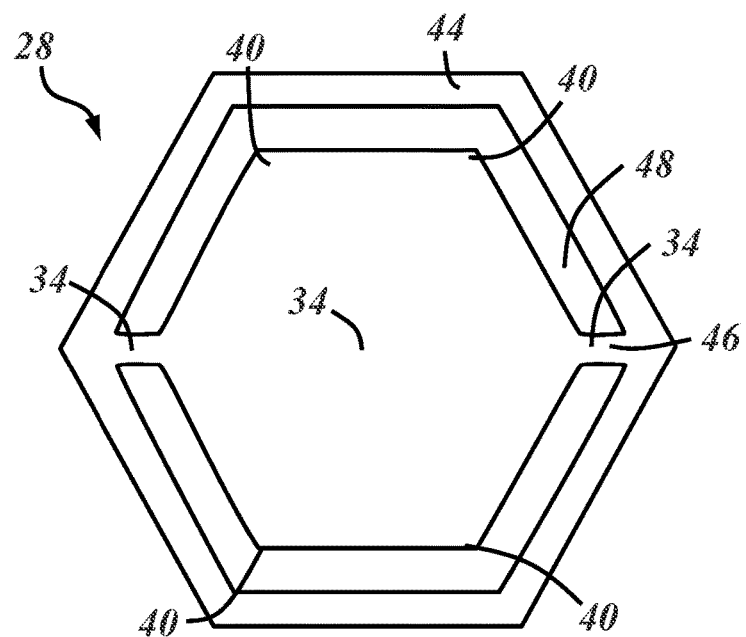
*Figure 4(c)*
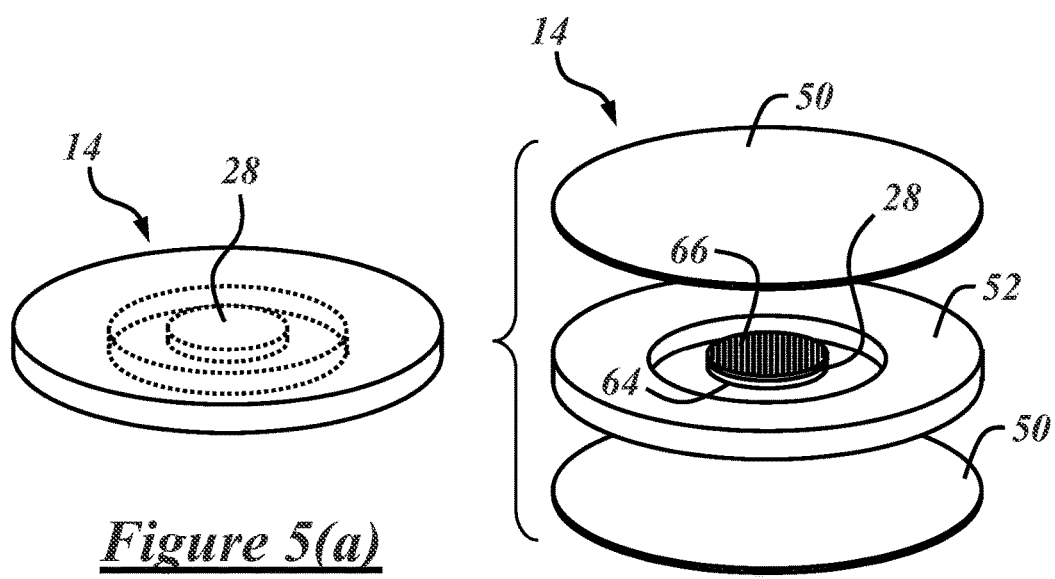
*Figure 5(a)*
*Figure 5(b)*

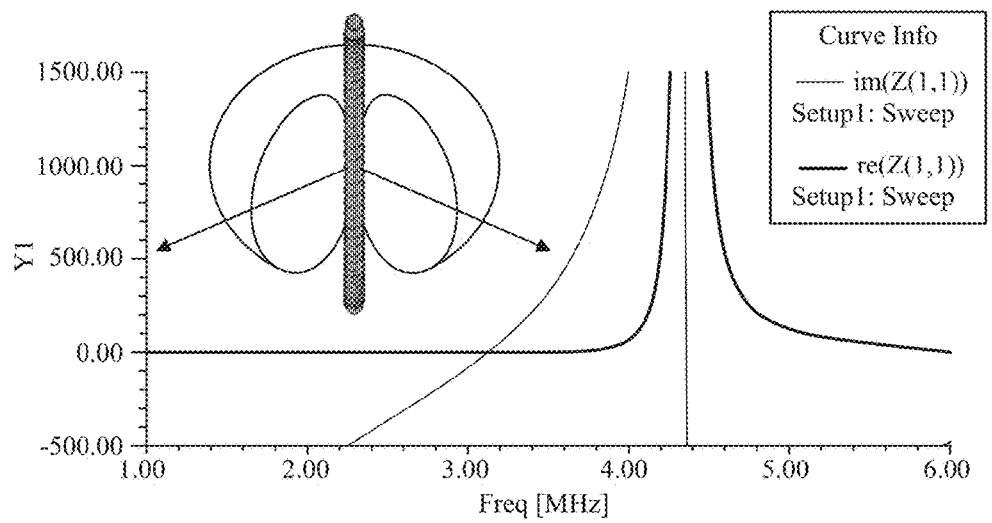
*Figure 15*
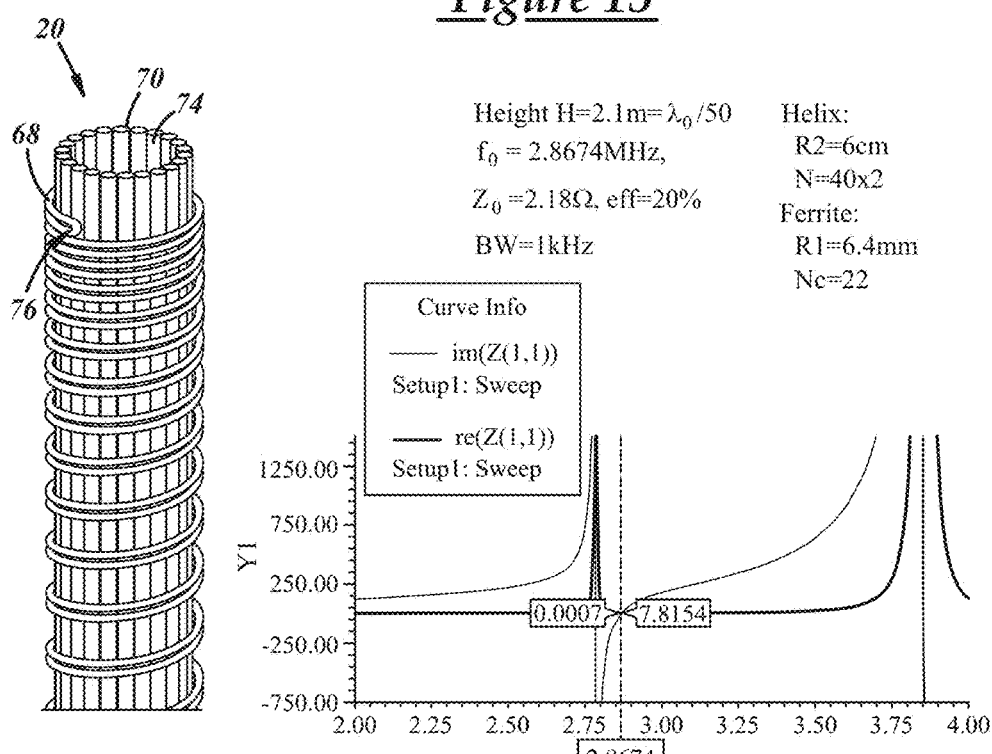
*Figure 16(a)*
Height H=2.1m=$\lambda_0$/50
$f_0$ = 2.8674MHz,
$Z_0$ =2.18Ω, eff=20%
BW=1kHz
Helix:
R2=6cm
N=40x2
Ferrite:
R1=6.4mm
Nc=22
Real/Image part of Input Impedance
*Figure 16(b)*

INTERROGATING SUBTERRANEAN HYDRAULIC FRACTURES USING MAGNETOELASTIC RESONATORS

TECHNICAL FIELD

The present disclosure relates generally to techniques for interrogating hydraulic fractures and, more particularly, to interrogating techniques that employ miniaturized magnetoelastic resonators.

BACKGROUND

Hydraulic fracturing is a method for increasing fluence and recovery rates of fluids from subterranean reservoir rock formations whereby rock layers are fractured using pressurized fluids. After drilling a wellbore, a fracture or field of fractures is initiated along the wellbore by pumping a fracturing fluid, such as a gel/water mixture, into the wellbore at a very high rate. A proppant is introduced into the fracturing fluid to prop the fractures open when the fracturing fluid pressure is removed. The proppant typically includes hard particulate material, such as sand, concrete, or rock. The propped open fractures act as relatively high conductivity routes through which the reservoir fluid (e.g., oil or natural gas) can flow to the wellbore.

Because the preferred fracture planes of the reservoir rock formations are highly variable and difficult to predict, the location and shape of the fracture field resulting from a hydraulic fracture is essentially unknown. Knowledge of the location and paths of the fractures would be useful in a number of areas, including locating successive drilling locations to optimize reservoir coverage. Some techniques have been developed to estimate the path of the hydraulic fractures, including radioactive proppant tracing (which has environmental constraints), microseismic monitoring, and tiltmetering. However, accurate interrogation of the fractures and determination of the contents continues to be a major concern.

SUMMARY

In accordance with one aspect of the invention, there is provided a fracture interrogation system that includes an antenna adapted for placement in a subterranean wellbore and a plurality of pseudoparticles adapted for distribution with a proppant material into hydraulic fractures along the wellbore. The presence of the pseudoparticles in the hydraulic fractures is detectable by the antenna. In one or more embodiments, the fracture interrogation system includes one or more of the following features:
- at least some of the pseudoparticles include a magnetoelastic resonator having a resonant frequency;
- an interrogation field source operable to excite magnetoelastic resonators at a resonant frequency for detection by the antenna;
- the antenna is an interrogation field source operable to excite magnetoelastic resonators at a resonant frequency;
- a different second antenna operable as an interrogation field source;
- the antenna is configured to operate in separate talk and listen modes;
- one or more of the plurality of pseudoparticles produces an electromagnetic signal in response to an electromagnetic wave impulse, a mechanical impulse, and/or an acoustic impulse.
- at least some of the pseudoparticles are configured to self-orient in a fracturing fluid;
- the antenna is a folded helical antenna;
- the antenna is a helical antenna with a non-uniform pitch;
- an antenna array that includes the antenna.

In accordance with another aspect of the invention, there is provided a method of interrogating subterranean hydraulic fractures. The method includes the step of detecting the presence of magnetoelastic tags distributed along the hydraulic fractures. In one or more embodiments, the method includes one or more of the following features:
- the step of distributing the magnetoelastic tags along the hydraulic fractures along with a proppant material;
- the step of positioning an antenna in a wellbore, the antenna being capable of detecting the presence of magnetoelastic tags oscillating at a resonant frequency from 1 to 3 MHz;
- the antenna is also capable of interrogating the magnetoelastic tags;
- the step of moving an antenna along the length of a wellbore to detect the presence of magnetoelastic tags at various depths and/or laterally spaced locations.

In accordance with another aspect of the invention, there is provided a pseudoparticle for use with a proppant material in a subterranean hydraulic fracture. The pseudoparticle includes a shell that is sized to fit within the hydraulic fracture with the proppant material, along with a magnetoelastic resonator that is housed in the shell. The resonator is configured to generate a response signal in response to an interrogation signal. In one or more embodiments, the pseudoparticle includes one or more of the following features:
- the resonator comprises a node and an anti-node, the shell comprises an internal hollow portion, and the resonator is supported in the shell at the node such that the anti-node is free to vibrate in the hollow portion of the shell;
- a center portion of the resonator is constrained between first and second portions of the shell and portions of the resonator away from the center portion are unconstrained in a hollow portion defined between the first and second portions of the shell.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

Illustrative embodiments will hereinafter be described in conjunction with the appended drawings, wherein:

FIG. 4(c) is an example of a frame-suspended resonator;

FIG. 5(a) is a perspective view of an encapsulated disc resonator;

FIG. 5(b) is an exploded view of the resonator of FIG. 5(a);

FIG. 15 is a plot of the real and imaginary part of input impedance of the helical antenna of FIG. 14(a), where the inset is the radiation pattern of the antenna;

FIG. 16(a) is a side view of a miniaturized, folded helical antenna;

FIG. 16(b) is a plot of input impedance for the antenna of FIG. 16(a); and

DESCRIPTION OF THE ILLUSTRATED EMBODIMENTS

Figure 1:
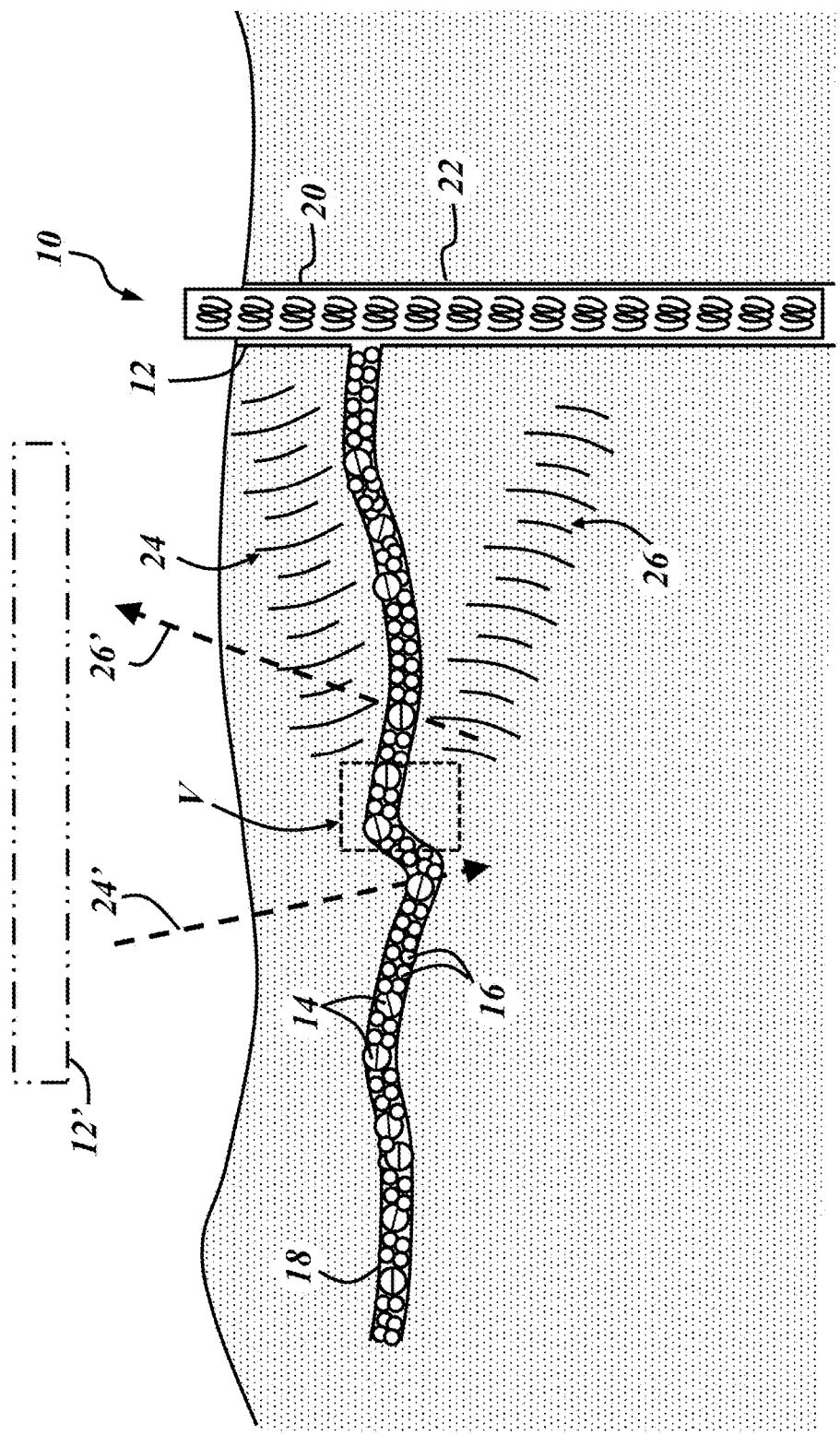
FIG. 1 illustrates an example of a subterranean fracture interrogation system employed in an oil well.

The fracture interrogating system and method described herein uses "smart" proppant-like pseudoparticles in conjunction with an interrogating antenna array and may be employed to supplement or replace known systems and methods. An illustrative fracture interrogation system 10 is shown in FIG. 1, which is not drawn to scale. The system 10 includes an antenna array 12 and a plurality of pseudoparticles 14. The pseudoparticles 14 are so-named because they are designed to behave similar to proppant particles 16 when deployed; that is, the pseudoparticles 14 can be mixed with conventional proppant material 16 and deployed into a hydraulic fracture 18 via the fracturing fluid in the same manner as the proppant material 16. While the pseudoparticles 14 may be sized and shaped like proppant particles 16, they are not merely material particles that function to prop open the fracture 18. Each pseudoparticle 14 is wirelessly detectable by the antenna array 12 under certain conditions.

The antenna array 12 includes one or more antenna 20 and is placed in a wellbore 22 and used to measure the surrounding terrain, potentially recording the conditions both before and after the fracturing process is performed. In particular, the antenna array 12 may be tuned to monitor the surrounding terrain for the presence of the pseudoparticles 14. The pseudoparticles 14 in a fractured volume V are interrogated by an interrogating signal or interrogation field 24 and a corresponding response signal 26 is received by the antenna array 12 and used to estimate the quantity, distribution, and/or type of deployed pseudoparticles 14 within that volume. The measured data is then correlated with the size, amount, and properties of fractures and the contents therein. Successive regions may be interrogated until a full image of the surrounding terrain is assembled. The interrogating signal 24 can originate at or be provided by the antenna array 12 or some other source. FIG. 1 also illustrates an interrogating signal 24' that originates above ground with a corresponding response signal 26' detected above ground, such as by an alternatively located antenna array 12'.

Figure 2:
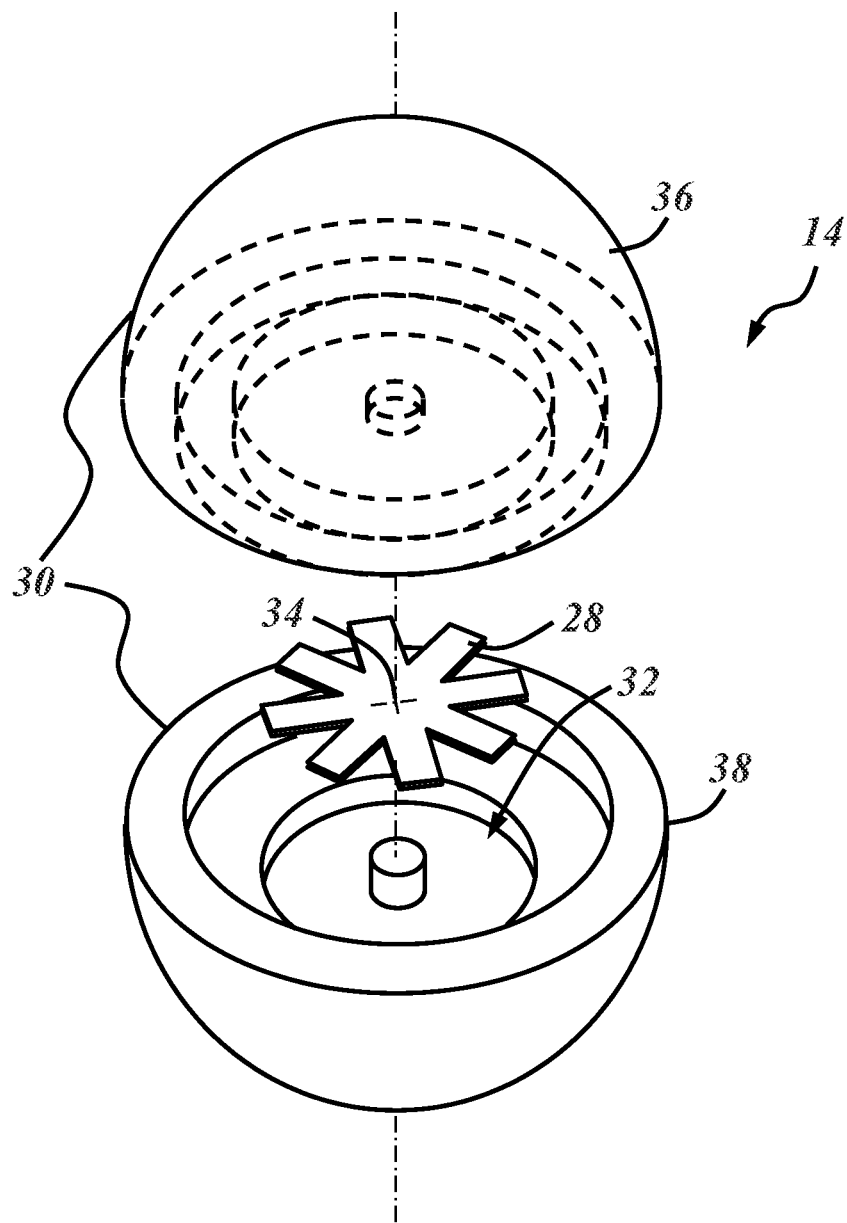
FIG. 2 is an exploded view of a pseudoparticle that includes a magnetoelastic resonator encapsulated in a shell.
Figure 3:
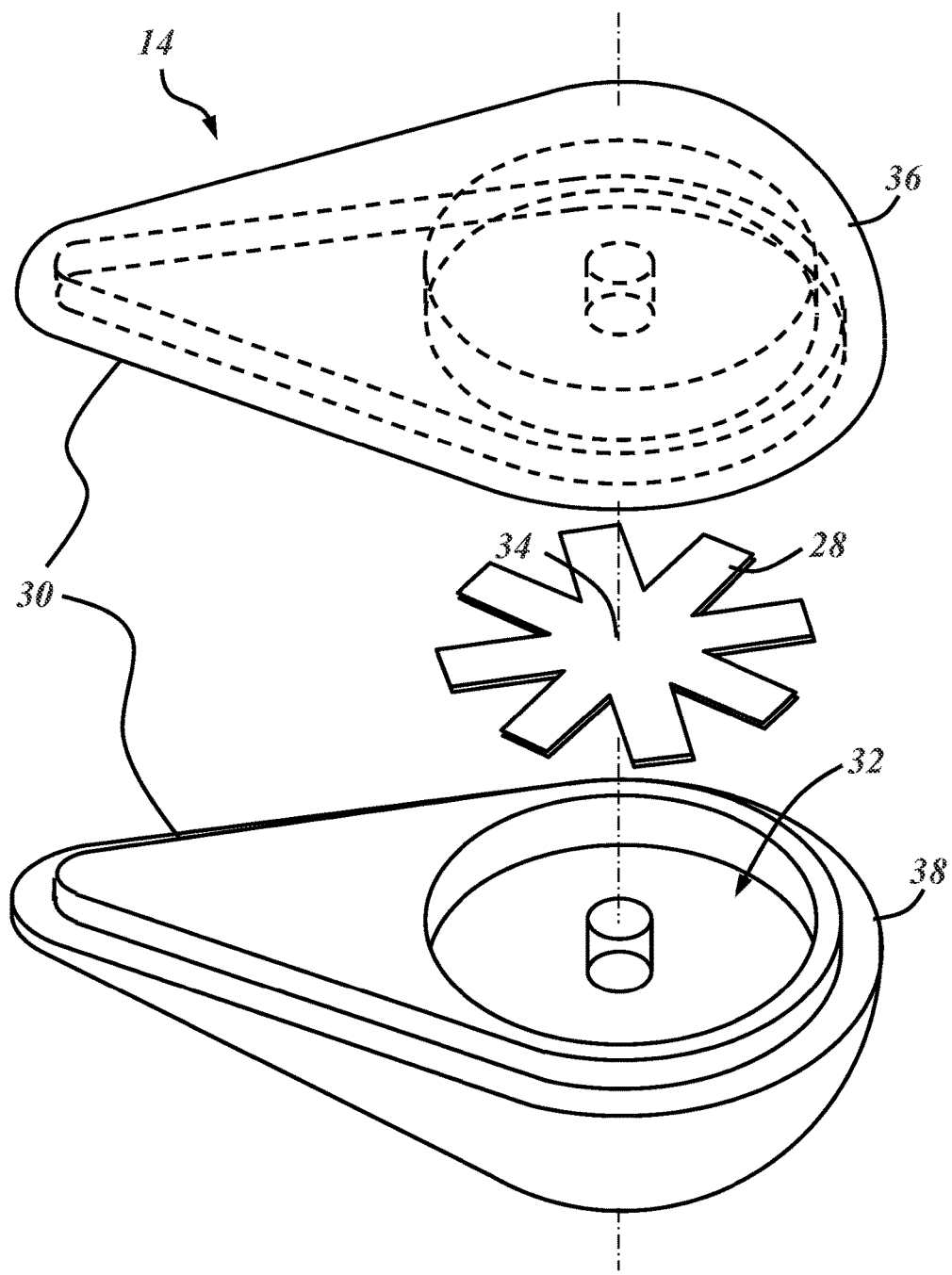
FIG. 3 is an exploded view of a pseudoparticle that includes a magnetoelastic resonator encapsulated in a streamlined shell.

The pseudoparticles 14 may be passive components that do not require any on-board power supply. In one embodiment, the pseudoparticles 14 include a magnetoelastic resonator 28 (or "tag") encapsulated in a protective shell 30, as shown in the examples of FIGS. 2 and 3. The magnetoelastic resonator 28 is formed from or includes a magnetoelastic material, such as a magnetoelastic material layer, and has a resonant frequency, based in part on its size, shape, and physical constraints. When the magnetoelastic resonator 28 is interrogated electromagnetically, acoustically, or by other magnetic or mechanical stimulus, the resonator 28 vibrates, resulting in the transmission of electromagnetic energy as part of the response signal 26. This back-scattered energy is measured by the antenna array 12. To maximize the amplitude of the vibration, at least a portion of the resonator 28 is preferably located within a hollow portion 32 of the shell 30, as shown in FIGS. 2 and 3, where the resonator does not touch the shell. Also, the resonator 28 is preferably supported by the shell 30 or some other component only at one or more null-vibration points or nodes 34. The encapsulating shell 30 is preferably non-conductive, to avoid signal attenuation, and is sufficiently strong to survive the pressures and temperatures experienced during deployment and in the fracture 18. The encapsulating shell 30 is sized to fit into hydraulic fractures 18, which are typically smaller than 2 mm. Though not shown explicitly in FIGS. 2 and 3, the pseudoparticle 14 may also include a bias field source, such as a magnetic or magnetizable shell, coating, or material layer within the shell 30.

To help maximize resonator 28 response to the interrogation field 24, the resonators 28 can be aligned as desired with the interrogation field 24. FIGS. 2 and 3 illustrate examples of pseudoparticle 14 configurations that can help provide the pseudoparticles, and thus the resonators 28, with a known orientation. The pseudoparticle of FIG. 2 can be made to rely on buoyancy force to achieve a predictable orientation, with first and second shell portions 36, 38 having different first and second densities. With the first and second shell halves or portions having different densities, the pseudoparticle will self-orient in a fluid, with the lower density portion above the higher density portion.

The pseudoparticle of FIG. 3 has an encapsulating shell 30 with a streamlined or teardrop shape that will self-align with the direction of the surrounding hydraulic fluid flow during deployment in the fractures 18. Pseudoparticle surfaces with affinity for water (hydrophilic) or oil (oleophilic) may be used to provide additional information regarding the contents of the environment.

Some general considerations pertaining to magnetoelastic sensing should be recognized. Magnetoelastic behavior is most prominent in materials with elongated magnetic domains. In the presence of an applied magnetic field, such as interrogation field 24, these domains tend to rotate and align with the field. As the long axes of the domains rotate and align, the material experiences mechanical strain. The magnetization of the material also responds to the applied field. For magnetoelastic materials used as resonant sensors, the oscillating magnetic flux produced as a result of oscillating strain in the resonator can then induce a voltage in a suitably located receiver, such as an antenna 20 or antenna array 12. The resonant detection scheme makes the system less susceptible to broadband noise and enhances electromagnetic coupling of the resonator material, allowing reduction in size or number of particles while maintaining signal strength.

The amorphous nature of magnetoelastic materials results in isotropic magnetostrictivity. The high permeability of alloys like FeNiMoB, FeCoBSi, and FeSiB enhances the antenna-like nature of the resonator by attracting flux lines and directing them into the plane of the resonator, which is desirable in that the orientation of the interrogating signal is not required to be exactly parallel with the plane of the resonator for good response. However, the high permeability can also be a disadvantage in that it limits how effectively the interrogation field can penetrate the resonator and how effectively the resonator can emit flux.

It should be noted that amorphous metals are not the only materials that exhibit large magnetostriction. So-called "giant magnetostrictive materials"—rare-earth-iron alloys like Terfenol-D (terbium, iron, and dysprosium) and Galfenol (gallium and iron)—may also be used.

Figure 4A:
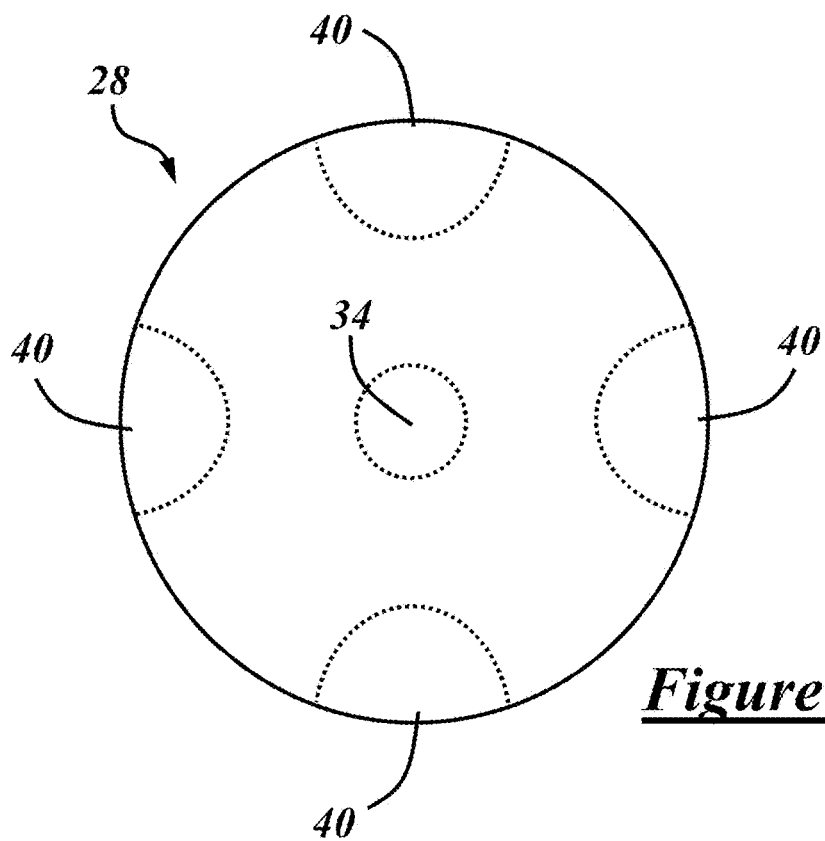
FIG. 4(a) illustrates node and anti-node locations based on FEA simulation results for a disc-shaped magnetoelastic resonator.
Figure 4B:
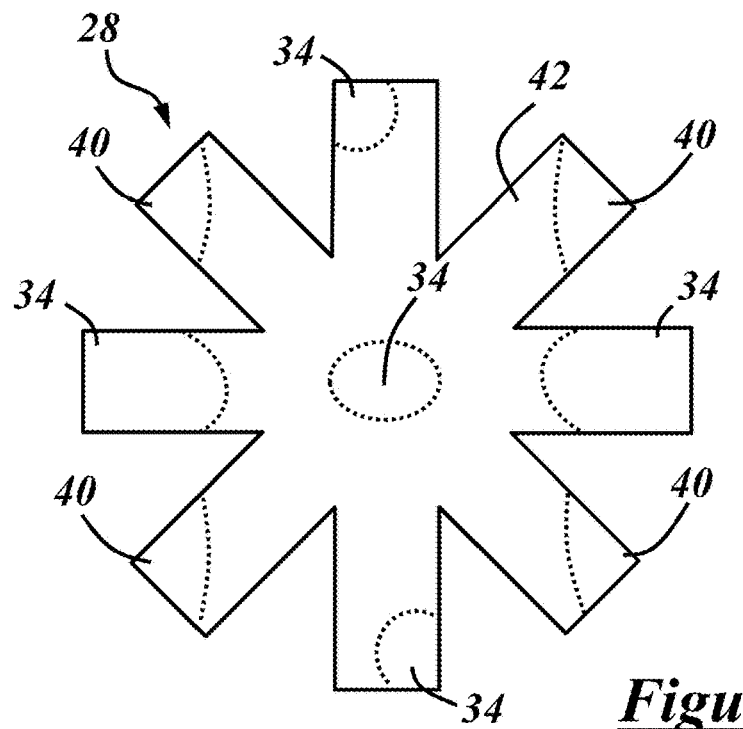
FIG. 4(b) illustrates node and anti-node locations based on FEA simulation results for an asterisk-shaped magnetoelastic resonator.

Typical commercially available magnetoelastic tags, such as those used in anti-theft systems, are approximately 4 cm long and 6 mm wide, which is problematic for use in the fracture interrogating system 10 described here. Two examples of suitable shapes for the resonator 28 are given in FIGS. 4(a) and 4(b) in the form of a disc-shaped resonator and an asterisk-shaped resonator, respectively. Each of these shapes is characterized by multiple axes of symmetry, which can facilitate a uniform response with respect to different in-plane orientations of the interrogation field 24. The disc resonator of FIG. 4(a) has a null-vibration point or node 34 in a low strain area at its center and anti-nodes 40 at its perimeter in high strain areas spaced 90° from each other. The asterisk-shaped resonator 28 of FIG. 4(b) also has a null-vibration node 34 in a low strain area at its center, with anti-nodes 40 in high strain areas at the ends of alternating arms 42 extending from the center.

Other miniaturized magnetoelastic tag configurations may be used. Another example of a magnetoelastic resonator 28 that can be fabricated on the order of 1 mm in diameter with a sufficiently detectable response to an interrogation field is illustrated in FIG. 4(c). The illustrated resonator 28 is hexagonal in shape and, like the previous resonator examples, has multiple lines of symmetry. The resonator 28 of FIG. 4(c) is a frame-suspended resonator with a resonator frame 44 circumscribing the resonator 28 and couplings 46 that couple the resonator with the frame at select locations about the perimeter of the resonator. A gap 48 is defined between the resonator 28 and frame 44. This particular resonator 28 is configured to be supported at the frame 44 rather than at the center of the resonator. When supported at the frame 44 (e.g. with the frame constrained) in the presence of a suitable interrogation field, the resonator 28 has null points 34 at its center and at the couplings 46, with anti-nodes 40 at the unsupported corners of the hexagonal shape. The hexagonal shaped resonator may alternatively be employed without the resonator frame (e.g., with center support), but may exhibit different node and anti-node locations.

One of the key challenges with magnetoelastic resonator miniaturization has been maintaining sufficient, detectable signal strength with significantly reduced sizes. The above-described resonators are configured so that they are spaced away from the substrate carrier (e.g. the encapsulating shell) and allowed to vibrate unhindered by interaction with the substrate carrier. Such suspended magnetoelastic resonators can be reduced to $1/100^{th}$ the size of commercially available resonators while maintaining a large portion of the signal strength. It has also been demonstrated that such suspended resonators are additive in nature—i.e., clusters of hundreds of resonators produce a response signal hundreds of time greater than a single resonator, even when not all of the resonators are aligned with the interrogation field.

A possible complementary technology to the magnetoelastic resonators described herein is radio frequency identification (RFID). In RFID tags, onboard passive or active electrical elements allow the tag to backscatter incident electromagnetic energy at a specific frequency or set of frequencies. RFID tags are used commercially (e.g. in anti-theft systems), and can be produced at costs ranging from $0.05 to $5. One difference between typical RFID tags of the size required for use in the fracture interrogating system 10 and similarly sized magnetoelastic tags 28 is the operating frequency, which is 800 MHz or higher for RFID tags and only about 1.5 MHz for magnetoelastic tags. Electromagnetic fields at the lower operating frequency of the magnetoelastic tags will experience less attenuation through the subsurface terrain. Table I provides a semi-quantitative comparison between magnetoelastic tags and RFID tags. While magnetoelastic tags offer some advantages over RFID tags, pseudoparticles 14 equipped with RFID tags may be suitable in some cases or may become more suitable over time.

TABLE I

Comparison of Magnetoelastic and RFID tags

| | Magnetoelastic | RFID |
|---|---|---|
| Size | + | + |
| | As small as 2 mm or less | As small as 1 mm × 1 mm |
| Cost | + | +/− |
| | Material cost < Si wafers | As low as $0.05 up to $5 |
| Operating Frequency | + | − |
| | 1-2 MHz for this size | 800+ MHz for this size |
| Power Requirement | Comparable | Comparable |
| Range | Comparable | Comparable |
| Commercially Viable | Yes | Yes |

In embodiments that employ magnetoelastic resonators, inexpensive and readily available bulk magnetoelastic foil, such as Metglas 2826 MB, can be used as the base material for the resonators. Photochemical machining is one suitable technique for medium volume prototyping, while metal stamping or metal alloy quenching techniques can be used for manufacturing larger quantities.

The package or encapsulating shell 30 for the resonator 28 must be capable of surviving the environmental stresses of the hydraulic fracture 18, including temperature and pressure. Plastic molding is one option for production of the encapsulating shells. Alternative fabrication techniques may include glass-fit molding or ultrasonic machining of ceramic spheres. In some embodiments, the base material of the shell 30 includes magnetic particles that are distributed or embedded within the material which, upon magnetization, provides a sufficient biasing field for the magnetoelastic resonator 28. Alternatively, a thin magnetizable or permanent magnet film or foil can be packaged with the resonator 28 to provide the biasing field.

Figure 5C:
FIG. 5(c) is a photographic image of a working example of the encapsulated disc resonator of FIGS. 5(a) and 5(b), shown resting on a U.S. penny.

Experimental pseudoparticles 14 have been fabricated according to the example illustrated in FIGS. 5(a)-5(c) in which a disc-shaped resonator 28 is encapsulated between two capping or substrate layers 50. A spacer 52 is provided so that the capping layers 50 are spaced apart by an amount that allows the resonator 28 to vibrate relatively unhindered—i.e., the resonator 28 is not tightly sandwiched between the two capping layers 50. One of the fabricated pseudoparticles 14 is shown in FIG. 5(c) next to a U.S. penny.

Figure 6:
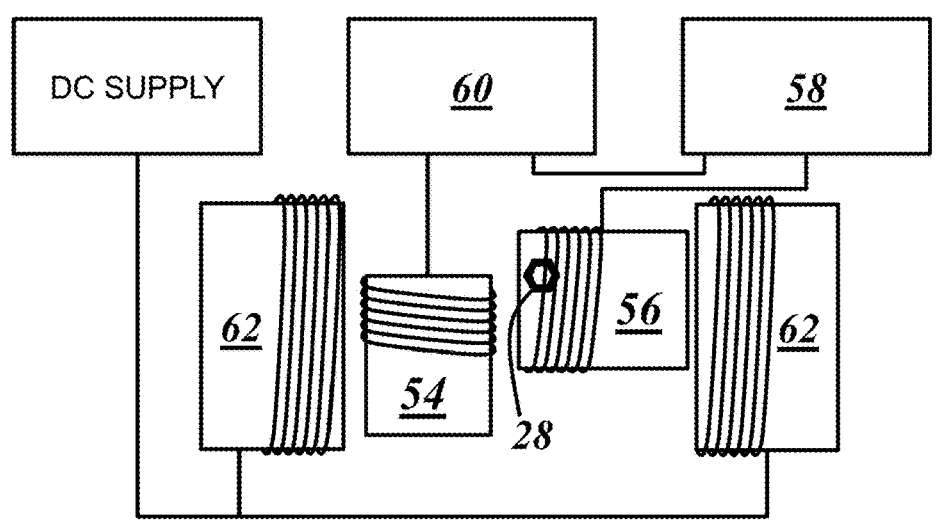
FIG. 6 is a schematic illustration of an experimental set-up used to evaluate magnetoelastic resonators.
Figure 7:
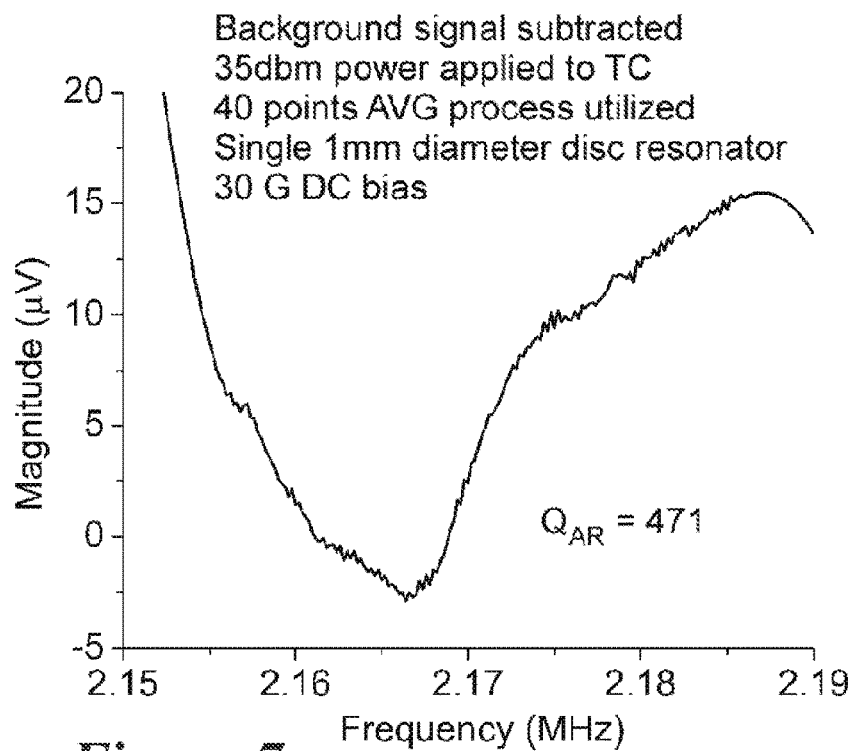
FIGS. 7-8 are plots of a typical frequency response of a 1 mm diameter disc resonator on a glass substrate.
Figure 8:
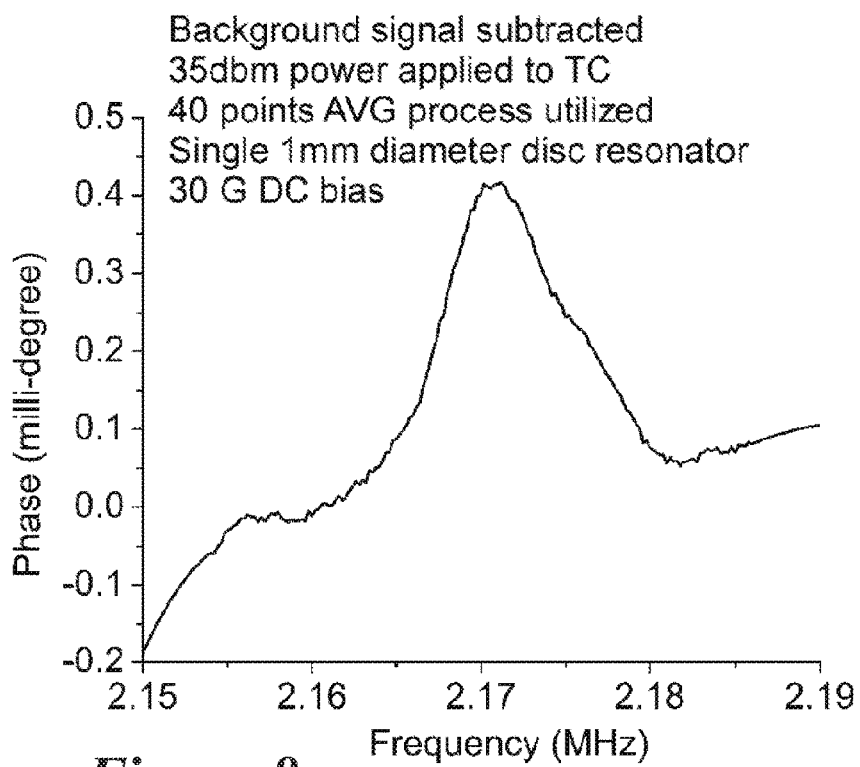
Figure 9:
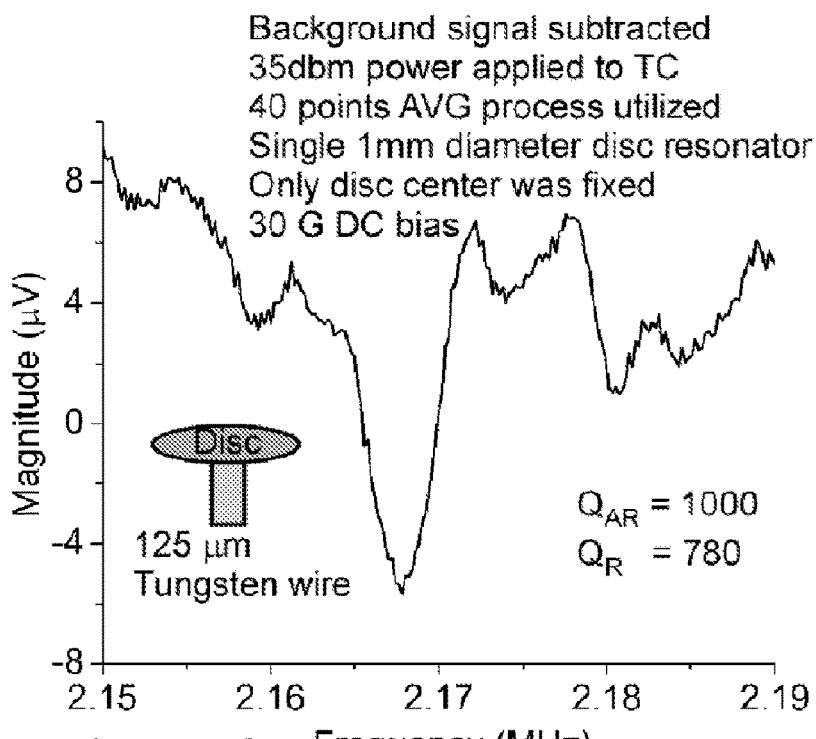
FIGS. 9-10 are plots of a typical frequency response of a 1 mm diameter disc resonator supported at its center.
Figure 10:
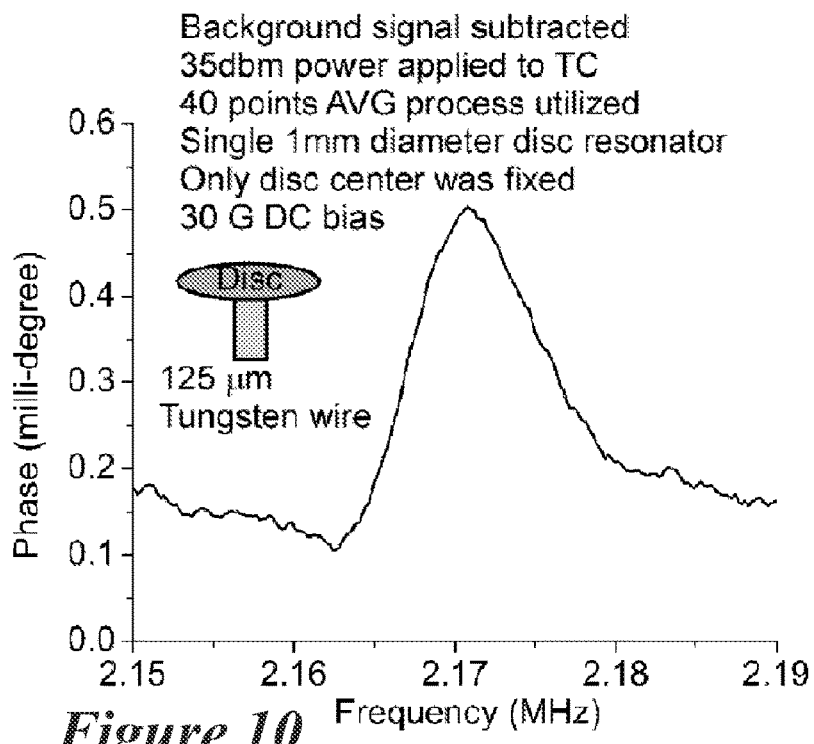

Measurement of the frequency response of the unpackaged disc resonators 28 has been carried out using two closely spaced small coils 54, 56 arranged orthogonally to each other. The orientation of the coils—one transmit coil 54 and one receive coil 56—is shown schematically in FIG. 6. The particular coils 54, 56 used here were turned using 60-stranded 22 AWG Litz wire, in which each individual conducting strand is insulated. The number of turns in the transmit and receive coils 54, 56 were kept low (10) in order to lower the coil impedance and increase the magnitude of the transmitted magnetic field at the frequencies of interest. The transmit and receive coils 54, 56 both had a diameter of about 3.9 cm. In this set-up, a network analyzer 58 sweeps the frequency of the input signal, which is sent to an amplifier 60 and the transmit coil 54. The transmit coil 54 generates an oscillating AC magnetic field that drives the resonator 28 into vibration. The vibration in the resonator 28, along with the magnetoelastic nature of the resonator material, generates a magnetic field in response. This response field induces a voltage in the receive coil 56, which is measured by the network analyzer 58. The required DC bias is provided by a pair of Helmholtz coils 62. In this measurement, 35 dBm (≈3 W) was applied to the transmit coil 54. As shown in FIGS. 7-10, response signals are produced by a 1 mm disc resonator when resting on a glass substrate (FIGS. 7-8) and when supported at the center of the resonator by a tungsten wire (FIGS. 9-10). The center-supported condition provides a very high quality factor, which is preferred for a number of efficient interrogation schemes.

The pseudoparticle 14 illustrated in FIGS. 5(a)-5(c) includes a 1 mm diameter disc of magnetoelastic material as the resonator 28, a 1 mm diameter disc permanent magnet 64 formed from Arnokrome™ 5 material, a ring-shaped polymer spacer 52, an isolating layer 66 of $Mg_3Si_4O_{10}(OH)_2$ powder, and two layers of adhesive tape as the capping layers 50. To construct this pseudoparticle 14, a relatively thick (≈200 µm) transparency layer that serves as the spacer 52 was first punched with 1.5 mm diameter holes large enough for the 1 mm diameter resonators 28. Next, the transparency layer was attached to one (bottom) layer of adhesive tape. The isolating layer 66 was then used to cover the exposed area of adhesive tape so that the resonator 28 would not adhere to the tape. The permanent magnet 64 and the resonator 28 were then placed in the formed cavity. Another thin layer 66 of isolation powder was placed on top of the resonator 28 before the second layer of adhesive tape (the top capping layer 50) was used to seal the resonator 28 in the cavity. Finally, the whole unit is punched out from all of the layers, forming a sealed cavity with the resonator 28 and bias magnet 64 within. Though not shown in this example, an intermediate spacing layer could be included between the resonator and the bias magnet to adjust the magnitude of the bias field. It is noted that this particular example of the pseudoparticle 14 is intended for use in laboratory testing only—i.e., the materials have not been selected to withstand the pressures or temperatures present in hydraulic fractures and wellbores.

Figure 11:
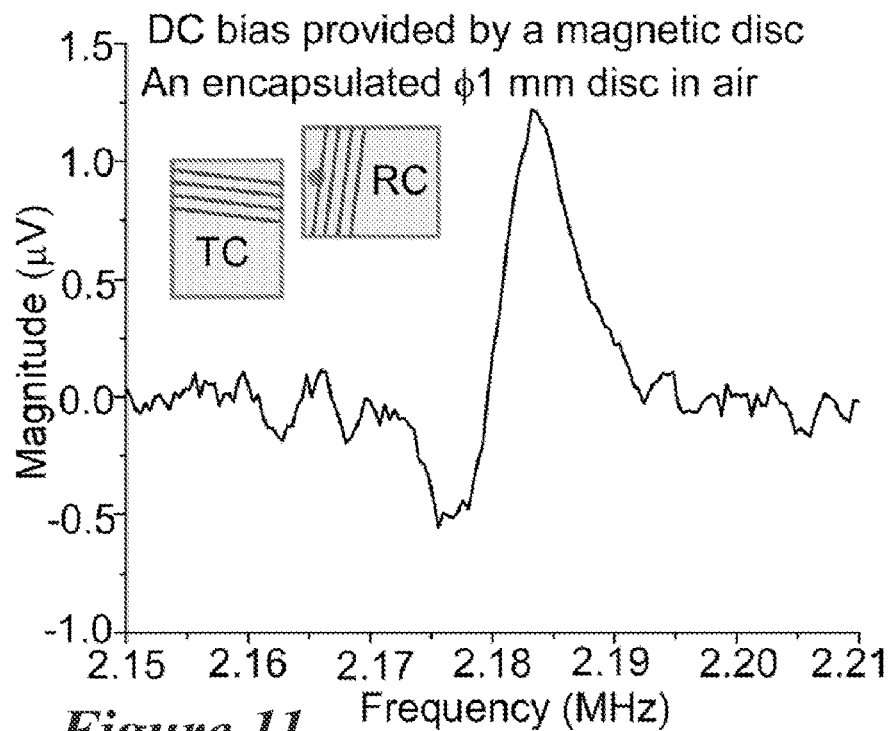
FIGS. 11-12 are plots of a typical frequency response of a 1 mm diameter disc resonator encapsulated with a bias magnet.
Figure 12:
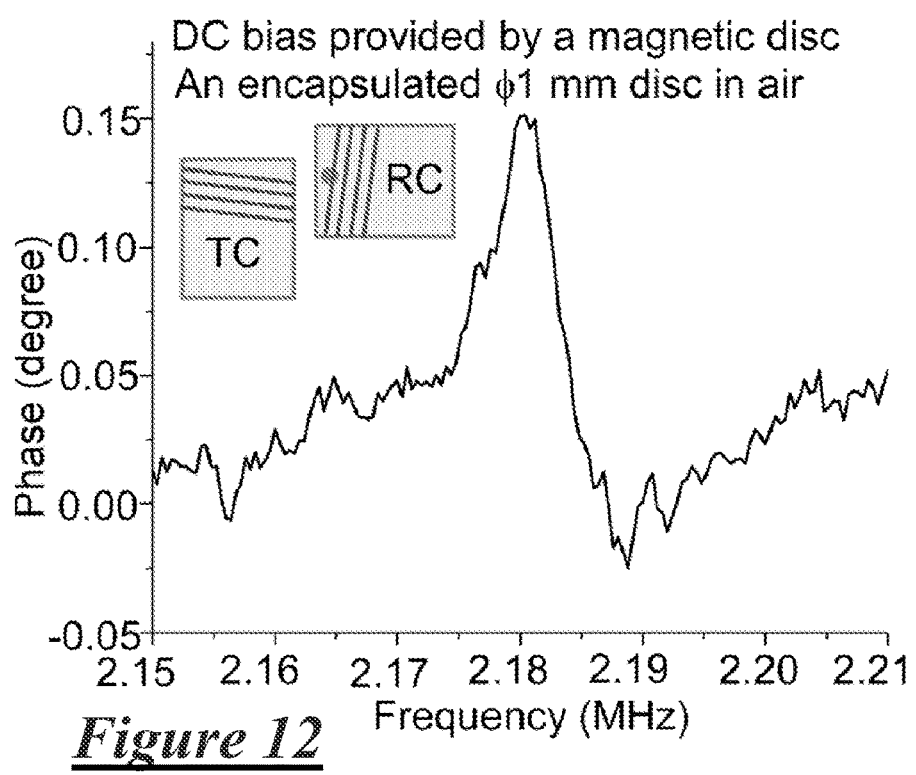

The frequency response of the packaged "smart" pseudoparticle 14 was measured using an experimental setup similar to that for the unpackaged disc resonators described above in conjunction with FIGS. 7-10, except no DC coils were used because the DC bias field was provided by the magnet inside the pseudoparticle. For these measurements, 25 dBm (≈0.3 W) was applied to the transmit coil. It is noted that a large common mode signal exists between the transmit coil and the receive coil, to which the resonator signal is added. To better illustrate the resonator response in the following figures, the common mode signal has been removed via post-processing of the data. The common mode signal usually exists as a linear function between magnitude and frequency. Thus, the post-processing included subtracting a linear estimate of the common mode signal (found from fitting multiple data points that are away from the resonant frequency of the resonator) from the overall signal. As shown in FIGS. 11-12, response signals are produced by the fabricated pseudoparticles.

The pseudoparticles are similar in size to commonly used proppants. As such, standard and typical procedures for proppant injection in hydraulic fracturing processes can be used to deploy the pseudoparticles toward and into the fracture sites. The pseudoparticles can be mixed in with other standard proppants to any desired fraction, and higher pseudoparticle fractions may provide higher signal strength from within a given volume.

To be visible to the antenna array after being distributed within the hydraulic fractures, the resonators must provide a relative magnetic permeability that is in high contrast to that of the surrounding terrain (approximately 1). While the magnetoelastic material itself presents a relative permeability of about 70 (at the interrogation frequency and when not vibrating) the resonant characteristic and magnetomechanical coupling of the material present an added effective relative permeability at the resonant frequency that can be estimated theoretically by:

$$\mu_{eff}\mu_0(\omega = \omega_r) \approx d'^2 E' Q \frac{8}{\pi^2} + \mu_{r,blocked}\mu_0 \qquad (1)$$

where $\mu_{eff}$ is the total effective relative permeability of the resonator at resonance, $\mu_0$ is the permeability of free space, d' is the magnetostrictivity of the material, E' is the Young's Modulus of the material, Q is the quality factor of the resonance, and $\mu_{r,blocked}$ is the relative permeability of the non-vibrating material (~70). With typical values of magnetostrictivity (2.7E-8 m/A) and Young's Modulus (110 GPa), and observed quality factors of 500+, the effective relative permeability at resonance is estimated to be as high as 26,000.

Figure 13:
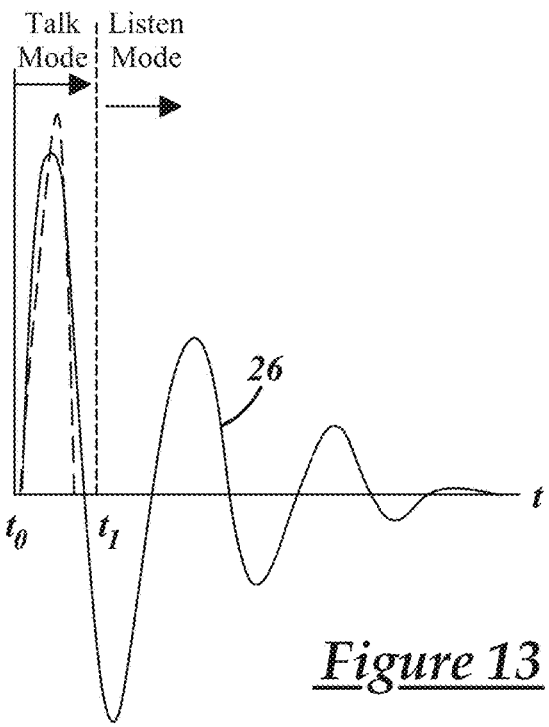
FIG. 13 is a plot illustrating talk-and-listen interrogation.

As mentioned above, the received response is a mixed signal of the resonant response generated by the magnetoelastic resonators and the interrogating signal. The interrogating signal is typically very strong compared to that of the back-scattered resonant response signal, which makes it difficult to distinguish the resonant response. In other words, signal feed-through can present a problem. Thus, an interrogation method that allows decoupling of these two signals can potentially increase sensing range significantly. In one embodiment, the fracture interrogating system employs a talk-and-listen scheme to help decouple the interrogation signal from the response signal. As shown in the example of FIG. 13, this scheme includes two separate modes: a talk mode defined between $t_0$ and $t_1$, and a listen mode at $t>t_1$. In the talk mode, an impulse or harmonic interrogation signal 24 at the resonant frequency is produced by the antenna array or by some other interrogation field source. In the listen mode, the interrogation field source is deactivated or silenced and the antenna array 12 or other receiving coil "listens" for the response signal 26. Because the magnetoelastic resonators continue to oscillate after being excited by the interrogation signal 24, the only signal induced in the receiving coil or antenna array is from the response of the resonators during the listen mode. This approach temporally decouples the interrogation signal 24 from the response signal 26.

The antenna array 12 includes one or more antennas 20, and the interrogation system 10 may include more than one antenna array 12. Selection of an antenna structure suitable for use in a wellbore is somewhat problematic. The antenna or array must be physically sized to fit into a wellbore (having a small diameter) and capable of operation in the desired frequency band (1-2 MHz for use with miniaturized magnetoelastic resonators). Over the HF-band (1-30 MHz) the antennas employed in various communications systems have been based traditionally on loop- and dipole-based designs. Vertical radiators such as the dipole, monopole, top-loaded monopoles, T-antenna, Inverted-L antenna, and Triatic and Trideco antennas, have been reported in the past. Other HF antenna structures include a bi-folded monopole over infinite ground plane antenna structure, a fishbone antenna structure, a bi-conical antenna, a compounded log-periodic dipoles (LPDA) with monopole antenna, a V-shaped wirestructured bowtie antenna, and a parallel-plate antenna. All of these antennas are both physically and electrically large, making them extremely difficult to adapt for the wellbore maximum diameter constraint. Further, many of these antennas (e.g., monopole, folded monopole, and compounded LPDA) require the presence of an infinite ground plane at the base for proper operation. Even HF-antennas that have been miniaturized (e.g., quarter-wavelength microstrip, flat spiral rectangular loop) are physically large in two dimensions and not suitable for use in wellbores. Other low-profile and/or helical-based HF-antennas have also proven to be too large in diameter to be practical in a wellbore. In summary, a new antenna solution was necessary to enable the fracture interrogation system described herein.

Figure 14B:
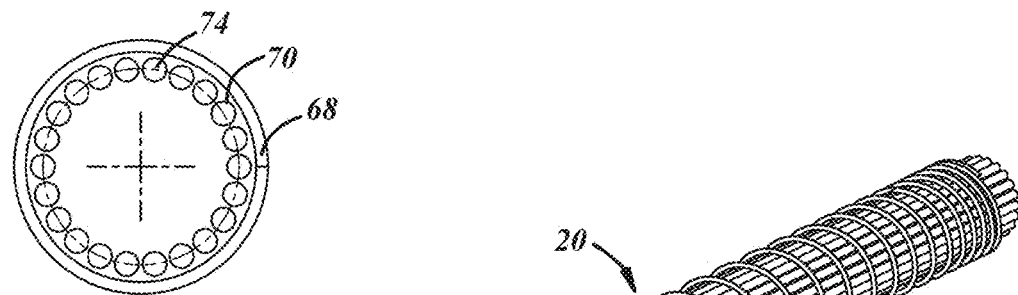
FIG. 14(b) is a longitudinal end view of the antenna of FIG. 14(a)
Figure 14A:
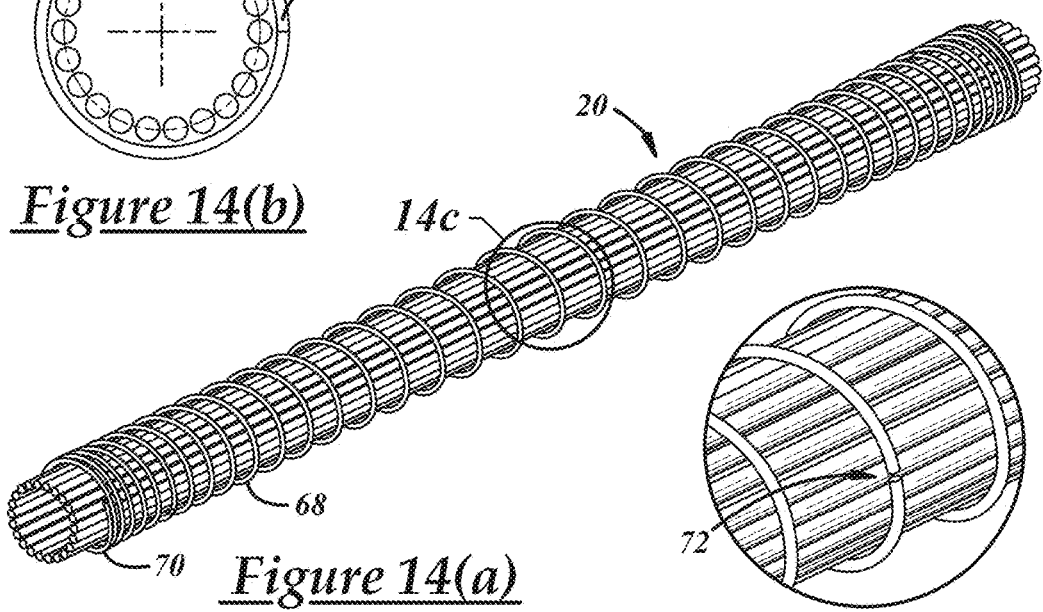
FIG. 14(a) is a perspective view of a non-uniform helical antenna with a one-layer composite core.
Figure 14C:
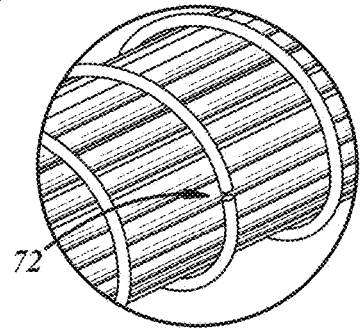
FIG. 14(c) is an enlarged view of a portion of the antenna of FIG. 14(a)

In one embodiment, the antenna array includes a ferrite-based helical antenna with a compact size that can fit into a 4-inch hole. In one particular embodiment, the antenna has a size of $\lambda_0/1337 \times \lambda_0/1337 \times \lambda_0/80$. An example of such an antenna 20 is illustrated in FIG. 14(a). FIG. 14(b) is an end view of the antenna of FIG. 14(a), and FIG. 14(c) is an enlarged view of the center of the antenna where the wire feed point 72 is located. The illustrated antenna 20 has a very small form factor and can also obtain a relatively high radiation efficiency close to 10%.

In the illustrated example, an open-end wire forms the helical conductor 68 wound around a composite core 70 to form a helical antenna 20 that operates in dipole mode. The total arc length of the helical wire is approximately equal to half of the wavelength in the media. The helical form has a non-uniform pitch in order to maximize the radiation efficiency, with the pitch being higher near the feed point 72 near the center of the antenna and decreasing near the end. This allows antenna miniaturization while placing the high ohmic resistance near the end where the current density is the lowest.

Use of high permeability material allows further miniaturization of the antenna. Nickel Zinc (NiZn) "61 material" from CWS ByteMark & Byte Mark that has low conductivity is appropriate for RF applications. Instead of a solid ferrite core, several thin ferrite cylinders 74 are used to create the composite core 70. This approach drastically reduces the eddy currents in the core and improves the radiation efficiency. In the particularly illustrated example, the plurality of cylinders 74 includes a quantity of 22 cylinders. In one embodiment, each cylinder 74 is about 12.8 mm in diameter, and the centers of the cylinders lie along a diameter of about 98 mm. The wire conductor is about 6 mm in diameter, and the core 70 is about 2099 mm in length.

The simulation result is shown in FIG. 15. Both the radiation pattern and the input impedance diagram are similar to a small dipole antenna. At the resonance of 3.12 MHz, the radiation impedance is 0.5Ω, which corresponds to the fact that the radiation impedance of a small dipole is proportional to the square of its length. The bandwidth of this antenna is 1 kHz. Note that in this example the resonant frequency is set at 3.12 MHz, but this can be easily scaled to achieve any desired frequency.

In the wellbore application, some cables extend through the entire length of the helix to connect the other antennas of the array. To mimic this field condition in the simulation, a long conductive cylinder was placed along the axial direction at the center of the helix. The simulation indicates that the antenna can achieve efficiency of better than 10% even in the presence of the central conductor.

One potential problem with the antenna illustrated in FIGS. 14(a)-14(c) and the simulated antenna is that the radiation impedance may be too low to be matched. This can also lead to low efficiency when the loss resistance becomes comparable to the radiation impedance. FIG. 16(a) illustrates another embodiment of the antenna 20 that helps address this problem. The helical conductor 68 in this embodiment is a folded helical antenna with a fold point 76 at a lengthwise end of the helical shape and a resulting dual-helix configuration. The simulation result is compared to the unfolded designs in Table II.

TABLE II

Simulation Results of Various Antennas

| | Antenna I | Antenna II | Antenna III | Antenna IV |
|---|---|---|---|---|
| Frequency (MHz) | 3.12 | 2.20 | 1.78 | 2.84 |
| Antenna Length | $\lambda_0/46$ | $\lambda_0/65$ | $\lambda_0/80$ | $\lambda_0/50$ |
| Bandwidth (kHz) | 1.0 | 0.7 | 0.7 | 1.0 |
| Radiation Efficiency | 29% | 4% | 10% | 24% |
| Input Impedance (Ω) | 0.6 | 0.3 | 0.4 | 2.1 |

In Table II, Antenna I is the antenna of FIGS. 14(a)-14(c) with no central conductor, Antenna II is the antenna of FIGS. 14(a)-14(c) with a central conductor, Antenna III is the antenna of FIGS. 14(a)-14(c) with a central conductor and two-layer cores, and Antenna IV is the antenna of FIG. 16j with no central conductor. The input impedance is plotted in FIG. 16(b) and is increased nearly four times with the folded helical antenna, while also achieving high radiation efficiency.

The above-described miniaturized helical antennas can be used as a transmit antenna in the wellbore hole and as antennas of a receiver array. In one embodiment, an antenna array(s) is synthetically formed by sweeping the position of a single antenna in the wellbore and mathematically combining the results. For example, a single antenna may be placed at one location in the wellbore to interrogate and/or receive data, then moved to another position in the wellbore to and/or receive data at a different location. To match the resonant frequency of the smart magnetoelastic pseudoparticles, the antenna can be tuned with the appropriate selection of length and number of turns. The helical antenna has a similar radiation pattern and the polarization direction as those of a short dipole antenna.

Figure 17:
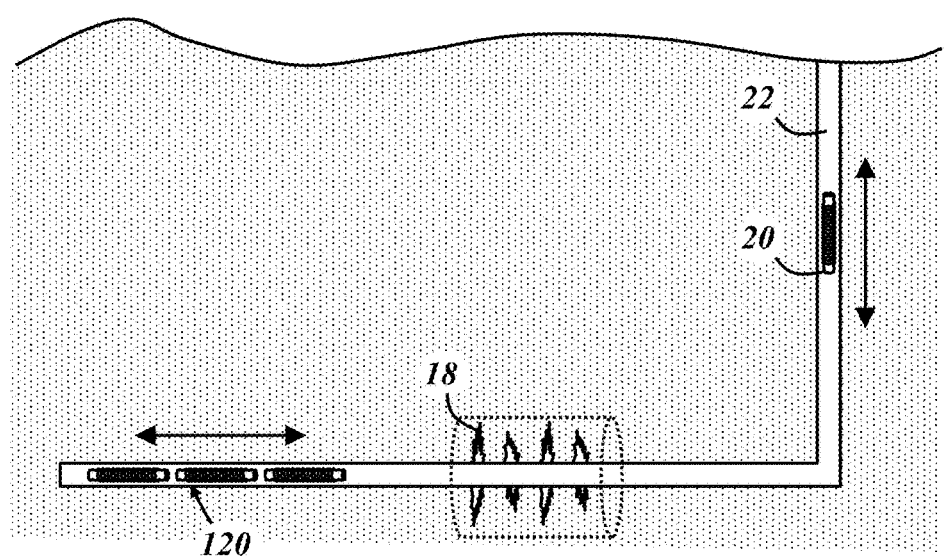
FIG. 17 illustrates a wellbore with vertical and lateral portions, with transmitting and receiving antennae respectively located in each portion.

In the example of FIG. 17, the transmitter antenna 20 is located in a vertical portion of the wellbore 22. When transmitting an electromagnetic wave, the presence of the distributed smart magnetoelastic pseudoparticles results in scattering of the electromagnetic wave. The receiver antenna 120 is located in a lateral portion of the wellbore 22. By moving the antennas along the wellbore portions, the field distribution can be measured for every position of the transmit antenna 20 in the vertical wellbore.

At 2 MHz, the conductivity of the subterranean rock is about $10^{-5}$ S/m, and the loss due to that conductivity is negligible for a range of a few kilometers. Using this approach, the distribution of the field magnitude can be estimated with the transmit antenna 20 located at different heights along the wellbore. Regions in which the received field magnitude is large due to back-scattering from the resonators indicate the presence of a fractured region.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A fracture interrogation system, comprising:
an antenna adapted for placement in a subterranean wellbore; and
a plurality of pseudoparticles adapted for distribution with a proppant material into hydraulic fractures along the wellbore, wherein the presence of the pseudoparticles in the hydraulic fractures is detectable by the antenna,
wherein the antenna has a helical configuration having a diameter sufficiently small to fit into and be moved along the wellbore, and
wherein the antenna is operable to detect HF-band electromagnetic energy back-scattered from the pseudoparticles.

2. The fracture interrogation system as defined in claim 1, wherein at least some of the pseudoparticles include a magnetoelastic resonator having a resonant frequency, the system further comprising an interrogation field source operable to excite the resonators at the resonant frequency for detection by the antenna.

3. The fracture interrogation system as defined in claim 2, wherein the antenna is the interrogation field source.

4. The fracture interrogation system as defined in claim 2, wherein a different second antenna is the interrogation field source.

5. The fracture interrogation system as defined in claim 1, wherein the antenna is configured to operate in separate talk and listen modes.

6. The fracture interrogation system as defined in claim 1, wherein one or more of the plurality of pseudoparticles produces an electromagnetic signal in response to an electromagnetic wave impulse.

7. The fracture interrogation system as defined in claim 1, wherein one or more of the plurality of pseudoparticles produces an electromagnetic signal in response to a mechanical impulse.

8. The fracture interrogation system as defined in claim 1, wherein one or more of the plurality of pseudoparticles produces an electromagnetic signal in response to an acoustic impulse.

9. The fracture interrogation system as defined in claim 1, wherein at least some of the pseudoparticles are configured to self-orient in a fracturing fluid.

10. The fracture interrogation system as defined in claim 1, wherein the antenna is a folded helical antenna.

11. The fracture interrogation system as defined in claim 1, wherein the antenna is a helical antenna with a non-uniform pitch.

12. The fracture interrogation system as defined in claim 1, further comprising an antenna array that includes the antenna.

13. A method of interrogating subterranean hydraulic fractures comprising the step of:
detecting an electromagnetic response of magnetoelastic tags distributed along the hydraulic fractures.

14. The method of claim 13, further comprising distributing the magnetoelastic tags along the hydraulic fractures along with a proppant material.

15. The method of claim 13, further comprising positioning an antenna in a wellbore, the antenna being capable of detecting the presence of magnetoelastic tags oscillating at a resonant frequency from 1 to 3 MHz.

16. The method of claim 15, wherein the antenna is also capable of interrogating the magnetoelastic tags.

17. The method of claim 13, further comprising moving an antenna along a length of a wellbore to detect the presence of magnetoelastic tags at various depths and/or laterally spaced locations.

18. A pseudoparticle for use with a proppant material in a subterranean hydraulic fracture, the pseudoparticle comprising:
a shell being sized to fit within the hydraulic fracture with the proppant material; and
a magnetoelastic resonator being housed in the shell, wherein the resonator is supported in the shell such that an anti-node of the resonator is unconstrained in a hollow portion of the shell, whereby the resonator is configured to generate a response signal in response to an interrogation signal.

19. The pseudoparticle as defined in claim 18, wherein the resonator further comprises at least one node and the resonator is supported in the shell at one or more of the nodes such that the anti-node is free to vibrate in the hollow portion of the shell.

20. The pseudoparticle as defined in claim 18, wherein a center portion of the resonator is constrained between first and second portions of the shell and portions of the resonator away from the center portion are unconstrained in the hollow portion of the shell.

* * * * *